(No Model.)  H. F. GASKILL.  5 Sheets—Sheet 1.

DUPLEX PUMPING ENGINE.

No. 324,372.  Patented Aug. 18, 1885.

Witnesses.
H. F. Parker.
D. D. Mott.

Inventor.
H. F. Gaskill
By Geo. M. Hopkins
Atty.

(No Model.)  H. F. GASKILL.  5 Sheets—Sheet 2.
DUPLEX PUMPING ENGINE.

No. 324,372.  Patented Aug. 18, 1885.

Witnesses.
H. F. Parker.
D. D. Mott.

Inventor.
H. F. Gaskill
By Geo. M. Hopkins
Atty (No Model.) 5 Sheets—Sheet 3.
H. F. GASKILL.
DUPLEX PUMPING ENGINE.
No. 324,372. Patented Aug. 18, 1885.
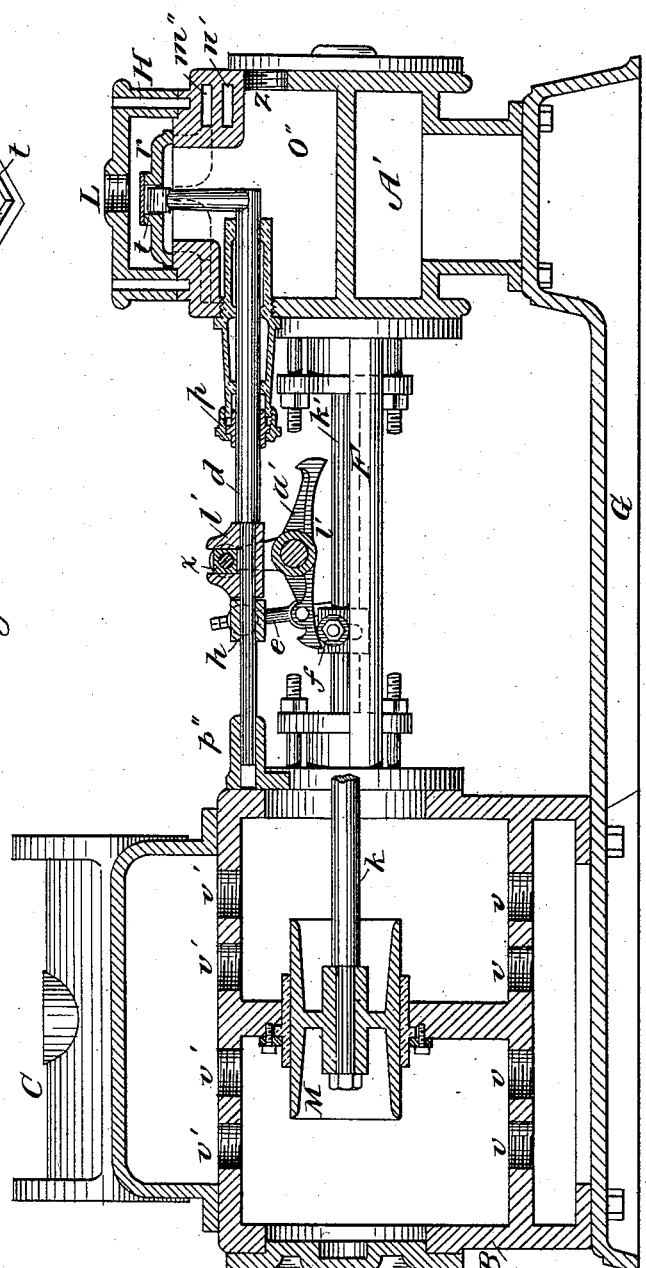

(No Model.) 5 Sheets—Sheet 4.
H. F. GASKILL.
DUPLEX PUMPING ENGINE.
No. 324,372. Patented Aug. 18, 1885.
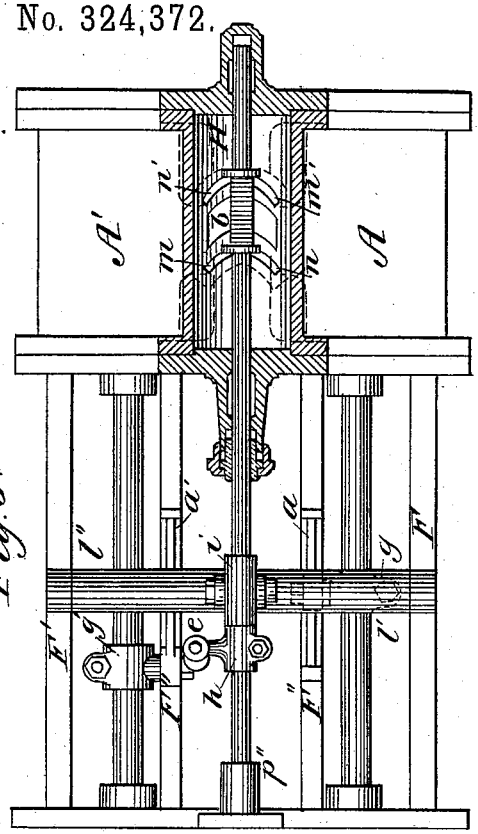
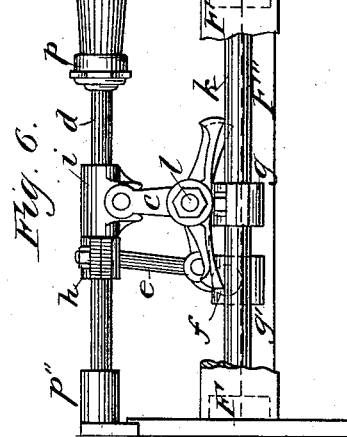
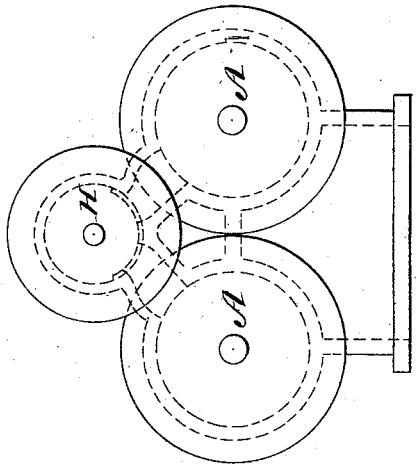
Witnesses.
H. F. Parker
S. D. Mott
Inventor.
H. F. Gaskill
By Geo. M. Hopkins
Atty (No Model.) 5 Sheets—Sheet 5.

H. F. GASKILL.
DUPLEX PUMPING ENGINE.

No. 324,372. Patented Aug. 18, 1885.

Witnesses.
H. F. Parker.
O. D. Mott.

Inventor.
H. F. Gaskill
By Geo. M. Hopkins
Atty

UNITED STATES PATENT OFFICE.

HARVEY F. GASKILL, OF LOCKPORT, NEW YORK.

DUPLEX PUMPING-ENGINE.

SPECIFICATION forming part of Letters Patent No. 324,372, dated August 18, 1885.

Application filed June 4, 1885. (No model.)

*To all whom it may concern:*

Be it known that I, HARVEY F. GASKILL, of Lockport, in the county of Niagara and State of New York, have invented a new and useful Improvement in Duplex Pumping-Engines, of which the following is a specification, reference being had to the annexed drawings, in which—

Figure 1:
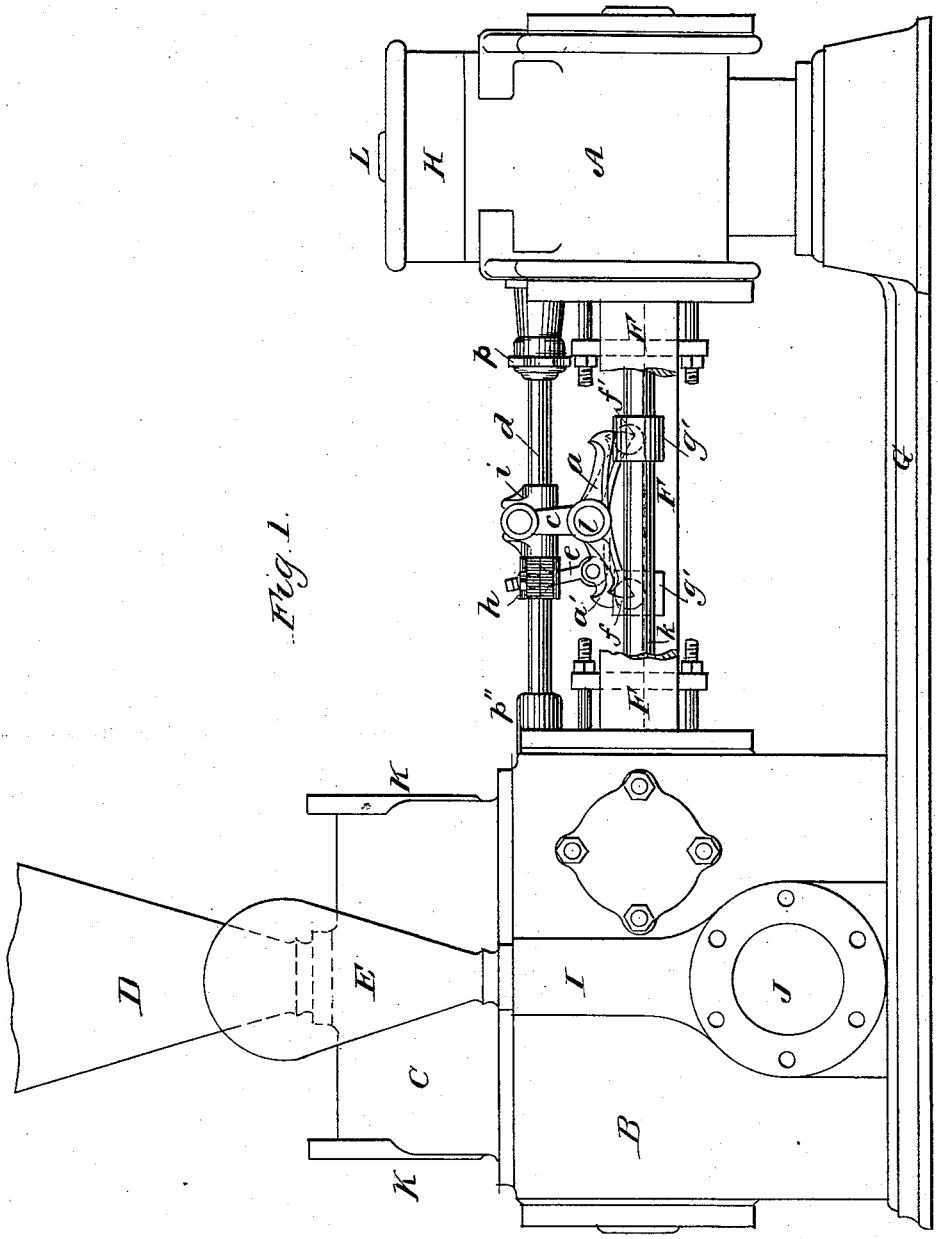
Figure 2:
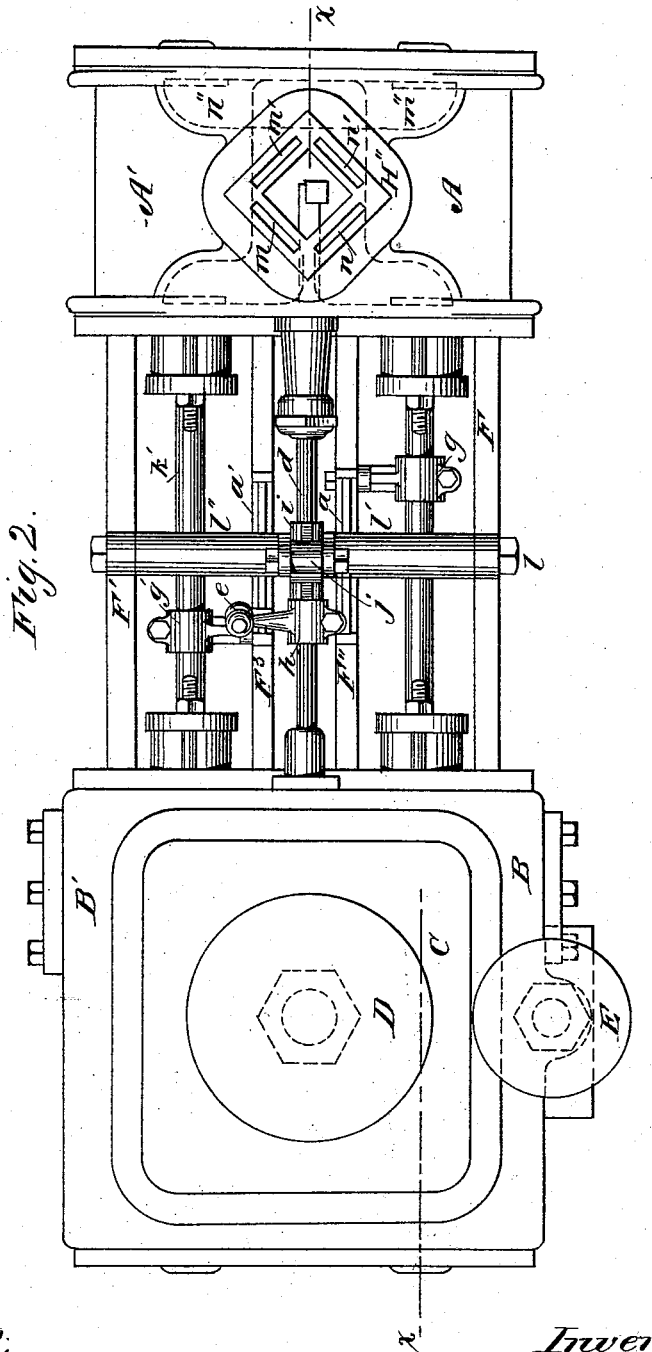
Figure 15:
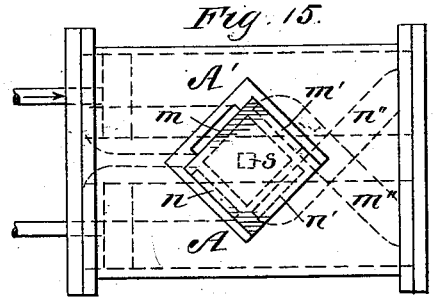
Figure 17:
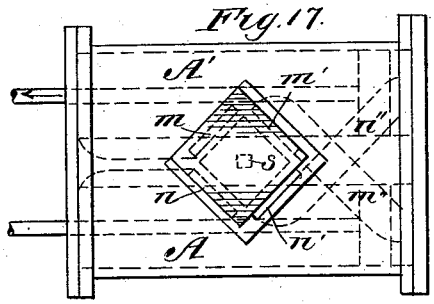

Figure 1 is a side elevation, partly in section, of a steam-pump embodying my improvements. Fig. 2 is a plan view with the slide-valve and steam-chest removed to show the arrangement of steam-ports. Fig. 3 is a vertical section taken on line $x\,x$ in Fig. 2. Fig. 4 is a perspective view of the under side of the valve. Fig. 5 is a sectional view of the cylindrical valve-chest and the valve-actuating mechanism. Fig. 6 is a longitudinal section of the same. Fig. 7 is an end elevation of the steam-cylinders and steam-chest, and Figs. 8 and 9 are, respectively, end and bottom views of the cylindrical valve, and Figs. 10 to 13, inclusive, represent the motions of the cylindrical valve diagrammatically. Figs. 14 to 17, inclusive, represent the movements of the flat valve diagrammatically.

My improvement relates to the class of engines in which the pistons move in approximately the same relative time that they would in an engine having its pistons arranged in connection with quarter-cranks, but without being supplied with the crank-shaft or fly-wheel.

In duplex pumping-engines or steam-pumps as usually constructed a valve has been provided for each engine, and the valve of one engine has been arranged to be operated by connection with moving parts of the other engine.

My invention consists in a single valve common to both steam-cylinders, and arranged to work over four ports, the valve being arranged to be operated by a single valve-rod, receiving both longitudinal reciprocating motion and rotary reciprocating motion from the moving parts of the engine.

My improvement applies with equal facility to either a flat slide-valve or an oscillating cylindrical valve. In either case the valve receives four motions—two longitudinally in opposite directions and two laterally in opposite directions. By employing a single valve and a single valve-rod, one steam-chest, and one source of steam supply for both cylinders, I am enabled to economize the construction of duplex steam pumping-engines to the fullest extent, and at the same time to secure a minimum of friction and wear.

In my present application I describe and claim a method of operation of my improved duplex pumping-engine, an application for the construction of which was filed December 4, 1884, Serial No. 149,455.

The steam-cylinders A A' and pump-cylinders B B' are mounted upon a base, G, and the water and steam cylinders are connected by four tie-rods, F F' F'' F'''. The cylinders A A' contain the usual steam-pistons, which are connected by rods K K' with the pistons M of the pump-cylinders.

Between and above the cylinders A A' is located the steam-chest H, having in the cover thereof the usual threaded aperture, L, for receiving the steam-supply pipe. The valve-seat H'' is provided with four steam-ports, $m$ $m'$ $n$ $n'$, arranged on four sides of a parallelogram, and with the exhaust-port $o'$ surrounded by the steam-ports. The steam-port $m$ communicates with the inner end of the cylinder A'. The steam-port $n$ communicates with the inner end of the steam-cylinder A. The port $m'$, by a passage, $m''$, communicates with the outer end of the cylinder A, and the port $n'$ communicates, through the passage $n''$, with the outer end of the cylinder A'. With this form and arrangement of valve-seat and ports it is necessary that the passages $m''$ $n'$ should cross each other in leading from the ports to the ends of the cylinders. The exhaust-port $o'$ communicates with the exhaust-passage $o''$ formed between the cylinders A A', and is provided with an outlet, Z, adapted to receive an exhaust-pipe.

With this construction the ports $m$ $m'$ are arranged at an angle of ninety degrees with each other, and at forty-five degrees with the center line of the pumping-engine, and on one side thereof, and the ports $n$ $n'$ are arranged in the same manner upon the opposite side of the center line, as shown; and the valve designed to cover these ports is rectangular in form, having a rectangular exhaust-cavity formed in the under surface thereof, also a central socket, $t$, for receiving the valve-actuating arm $o$. The edges of the valve $r$ are parallel with the ports $m\ m'\ n\ n'$, and the valve is capable of covering three of the ports in the valve H″, leaving one in communication with the valve-chest, and bringing the one opposite and parallel with it into communication with the exhaust-port $o$, while the intermediate ports are closed entirely. The valve-actuating arm $o$ is attached to or formed upon the end of the valve-rod $d$, which extends outward from the exhaust-passage $o''$ through a gland, $p$, and the gland $p$ is prolonged within the exhaust-chamber $o''$ to form a support for the inner end of the valve-actuating rod $d$. The opposite end of the valve-rod is supported and guided by a sleeve, $p''$, attached to the water-cylinders of the pumping-engine.

In the center of the space between the steam-cylinders A A′ and the water-cylinders B B′, a rod, L, is supported by posts secured to the tie-rods $f\ f'$. The rod L is arranged at right angles to the piston-rods $k\ k'$ and supports two sleeves, $l'\ l''$, to which are attached the valve-actuating cams $a\ a'$. The piston-rod $k$ is provided with an arm, $g$, which extends therefrom at right angles toward the center of the pump, and is provided with a roller, $f$, which rolls in contact with the tie-rod F″, and is capable of engaging the cam $a$ during the latter half of either stroke of the piston-rod $k$, so as to swing the said cam and turn the sleeve $l'$ and the arms $c$, projecting upward therefrom, on opposite sides of the valve-rod $d$. The valve-rod $d$ has a shoulder against which is placed a cross-head, $i$, having a transverse slot in its upper side to receive a roller, $j$, turning on the pin passing through the extremities of the arms $c$. The cross-head $i$ is fitted loosely to the valve-rod $d$, so that the valve-rod may turn therein, and it is held in position on the valve-rod by an arm, $h$, which is clamped on the rod and extends from the rod at right angles toward the piston-rod $k'$. Upon the piston-rod $k'$ is secured an arm, $g'$, which extends toward the center of the pump, at right angles with the rod $k'$, and carries at its extremity a roller, which rests upon the tie-bar F‴, and which is capable of engaging the cam $a'$ so as to turn it, together with the sleeve $l''$, during the latter half of each stroke of the piston-rod $k'$. The cam $a'$ and the extremity of the arm $h$ are connected by a ball-and-socket link, $e$, which admits of a free movement of the arm $h$ and the cam $a'$ in either direction.

Having thus described mechanism of this form of my improved duplex pumping-engine, I will proceed to describe its operation, and will afterward describe the application of the same principle to a cylindrical valve.

Figure 14:
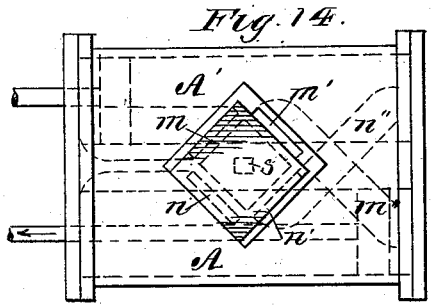
Figure 16:
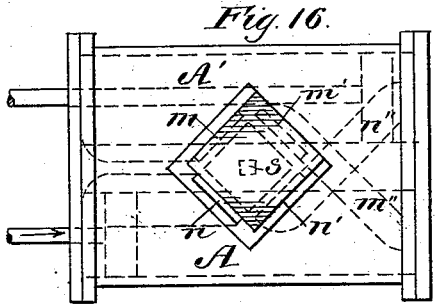

Beginning with the steam-pistons in the position shown in Fig. 14, the piston in the cylinder A′ having just completed its stroke in the direction of the pumping-cylinder, and the piston in the cylinder A being about to move forward in the direction of the arrow, the valve $r$ and valve-rod $d$ having been thrown forward toward the pump-cylinders by the action of the roller carried by the arm $g$ on the cam $a$, during the return movement of the piston in the cylinder A, and the valve having been thrown over toward the cylinder A by movement of the cam $a'$, resulting from the engagement of the roller $f$ on the arm $g'$ with the under surface of the said cam, steam enters the cylinder A through the port $m'$ and passage $m''$, into the outer end of the cylinder, while steam is allowed to escape from the opposite end of the cylinder through the port $n$ to the exhaust-port $o'$, thence outward through the passage $o''$ and exhaust-pipe connected with the opening Z. When the piston in the cylinder A moves forward during the latter half of its stroke, the roller carried by the arm $g$ engages the cam $a$ at the end nearest the pump-cylinders, and turns the said cam $a$, the sleeve $l'$, and the arms $c$ so as to move the valve $r$ longitudinally away from the pump-cylinders, opening the port $m$, and bringing the port $n'$ into communication with the exhaust-passage $o'$, allowing steam to enter into the front end of the cylinder A′ and to escape from the opposite end thereof through the port $n'$, while the ports $m'$ and $n$ are covered. During the latter half of the excursion of the piston in the cylinder A′, under the pressure of the steam admitted through the port $m$, the roller $f$, carried by the arm $g'$ on the piston-rod $k'$, engages the end of the cam $a'$ nearest the steam-cylinder and tilts the cam, which, by means of its ball-and-socket connection with the arm $h$ on the valve-rod $d$, turns the said valve-rod, so as to move the valve $r$ laterally into the position shown in Fig. 16, opening the port $n$, allowing steam to enter into the end of the cylinder A nearest the pump-cylinders, and opening the port $m'$, allowing steam to escape from the opposite end of the cylinder into the exhaust-port, at the same time covering the ports $m$ and $n'$. The piston in the cylinder A now moves forward in the direction indicated by the arrow, while the piston in the cylinder A′ remains stationary, and in the latter half of the excursion of the piston in the cylinder A the roller $f$, carried by the arm $g$, on the piston-rod $k$, engages the cam $a$, tilting the said cam, causing the valve $r$ to be moved forward toward the pumping-cylinders longitudinally, opening the port $n'$, admitting steam behind the piston in the cylinder A′, and bringing the port $m$ into communication with the exhaust-port $o'$, allowing steam to escape from the opposite end of the cylinder, at the same time covering the ports $m'$ and $n$. The valve $r$ is moved laterally during the latter half of the forward movement of the piston in the cylinder A, so as to open the port $m'$, and bring the port $n$ into communication with the exhaust-port $o'$, and close the ports $m$ and $n'$, when all of the parts will be in the position shown in Fig. 14 and ready to begin another cycle of operation like that just described.

In a valve of the form just described the valve-rod enters into the exhaust-passage and operates the valve from the under side, so that the valve-rod never needs packing, except to oppose the pressure of exhaust-steam.

It will be noticed that the ports $m'$ $m$ and $n$ $n'$ are opened in rotation, and that they are in the same manner closed and brought into communication with the exhaust-port $o'$. With this arrangement of valve and valve-operating mechanism it is unnecessary to provide for a steam-cushion to the pistons, as any movement of the pistons beyond the prescribed limit would open the port communicating with the exhaust side of the piston and admit live steam thereto, which would arrest the motion of the piston and parts connected therewith, and prevent the piston from striking the ends of the cylinder.

In Figs. 5 to 13, inclusive, I have shown the adaptation of my improvement to a cylindrical steam-valve. With this form of valve it is unnecessary to have any of the steam-passages cross each other in leading from the valve-ports to the ends of the cylinder.

Figure 11:
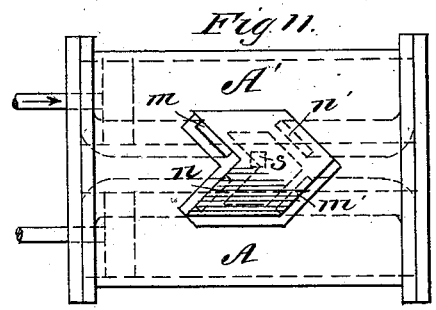
Figure 13:
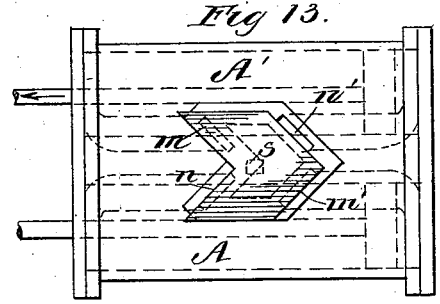
Figure 10:
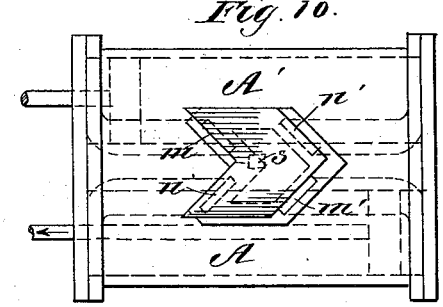
Figure 12:
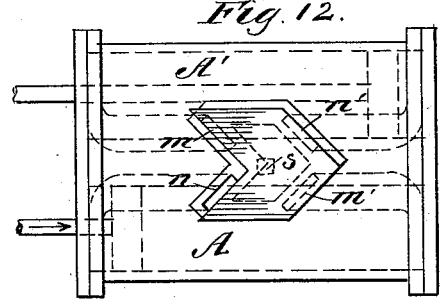

In a cylindrical steam-chest, H, located between the steam-cylinders A and A', are formed ports $n$ $m$ $n'$ $m'$, in two pairs, the ports $m$ and $n'$ being arranged obliquely, parallel with each other, and at an angle of forty-five degrees with a line drawn longitudinally along the bottom of the steam-chest, the ports $m'$ and $n$ being oppositely arranged upon the other side of the center line of the steam-chest, as shown, the exhaust-port $o'$ being located between the ports $m'$ and $n'$ $m$ $n$. The valve $r$, in this case, is formed of a segment of a cylinder, and is provided in its under surface with a cavity corresponding with the cavity in the rectangular valve $r$, before described. One end of the valve is angled, the edges thereof forming angles of forty-five degrees with the center line of the steam-cylinder, and the opposite end of the valve is notched with a rectangular notch corresponding in form with the opposite angled end, and also corresponding with the angles of the ports formed in the steam-chest. The valve $r$ is slotted in the back to receive the squared portion B of the valve-rod $d$, and upon the rod at each end of the squared portion are secured collars for engaging the ends of the valve. The valve-rod $d$ in this case is actuated by the same mechanism and in precisely the same manner as in the case of the rectangular valve, and the action of the valve may be traced by reference to Figs. 10 to 13, inclusive. With the valve in position shown in Fig. 10 the port $m'$ is open, permitting steam to enter the steam-cylinder A behind the piston or at the end remote from the pump-cylinders, and allowing it to escape from the opposite side of the piston to the exhaust-port $o'$, through the port $n$ and cavity in the valve $r$, the ports $m$ and $n'$, communicating with the cylinder A', being closed. The piston in the cylinder A is now moved forward in the direction indicated by the arrow, and during the latter half of its excursion it slides the valve-rod $d$, moving the valve $r$ away from the pump-cylinders, opening the port $m$, bringing the port $m'$ into communication with the exhaust-port $o'$, and covering the ports $m'$ and $n$. Steam now being admitted behind the piston in the cylinder A', or into the end of the steam-cylinder nearest the pump-cylinders, the said piston moves in the direction of the arrow, as shown in Fig. 11, and during the latter half of its excursion it effects the turning of the valve-rod $d$, in the manner already described, and swings the valve $r$ laterally, so as to open the port $n$, admitting steam behind the piston in the cylinder A, or into the end nearest the pump-cylinders, and allowing it to escape from the opposite side of the piston through the port $m'$, while the ports $m$ and $n'$ are covered. The piston in the cylinder A now moves forward in the direction indicated by the arrow, as shown in Fig. 12, and during the latter half of its excursion it slides the valve-rod $d$ toward the pump-cylinders, closing the ports $m'$ and $n$, opening the port $n'$, admitting steam behind the piston in the cylinder A', and bringing the port $m$ into communication with the exhaust-port, as shown in Fig. 13. The piston in the cylinder A' now moves forward in the direction indicated by the arrow, and during the latter half of its excursion the valve-rod $d$ is turned in the manner already described, bringing the valve into the position shown in Fig. 10, thus completing the cycle of operations, which is repeated over and over in the regular working of the pump.

The pump-cylinders B are of the ordinary construction, except that a passage, I, formed integrally with the casting, and communicating with the suction-chamber of the pump, is provided for receiving at the top an air-chamber, E, to prevent waterhammering in the suction chamber or pipes.

Although I have described one method of operating the valve of my engine and one type of valve, I do not limit nor confine my invention to this method only, as the four motions necessary to operate the valve may be effected in a variety of ways, which need not here be described in detail.

Having thus described my invention, what I claim as new, and desire to secure by Letters Patent, is—

1. In a duplex pumping-engine, the method of controlling the admission of steam to the cylinders by causing each piston, through the medium of a single valve-rod having longitudinal and rotary reciprocating motions, to cut off the admission of steam to its own cylinder and move the steam-valve so as to admit steam to one end and exhaust it from the opposite end of the other cylinder, substantially as herein specified.

2. The method of admitting steam to the cylinders of a duplex pumping-engine by imparting to a single valve common to both cylinders four rectangular movements, two movements in a direction parallel with the axes of the pump-cylinders and two movements in a line approximately at right angles with the axes of the cylinders, as herein specified.

HARVEY F. GASKILL.

Witnesses:
WASH. H. CROSS,
FRANK J. EIGHME.